United States Patent [19]
Emmett

[11] 4,401,012
[45] Aug. 30, 1983

[54] PISTON FOR DISC BRAKES

[75] Inventor: John E. Emmett, Farmington Hills, Mich.

[73] Assignee: Occidental Chemical Corporation, Niagara Falls, N.Y.

[21] Appl. No.: 270,731

[22] Filed: Jun. 5, 1981

Related U.S. Application Data

[63] Continuation-in-part of Ser. No. 202,510, Oct. 31, 1980.

[51] Int. Cl.³ .............................. F16J 1/00; F16J 1/10
[52] U.S. Cl. ........................................ 92/248; 92/249
[58] Field of Search ..................... 92/248, 249, 254; 188/73.36, 73.37, 322.22, 264 G, 370, 72.4, 72.5, 72.5, 73.31, 73.32; 403/326, 361, 404; 285/DIG. 22

[56] References Cited
U.S. PATENT DOCUMENTS

| | | | |
|---|---|---|---|
| 1,398,178 | 11/1921 | Lukacsevics | 92/212 X |
| 3,497,038 | 2/1970 | Schrader | 92/248 X |
| 3,528,301 | 9/1970 | Wasmer | 188/370 |
| 3,612,409 | 10/1971 | Henning | 285/DIG. 22 |
| 3,730,570 | 5/1973 | Brochstein | 403/361 |
| 4,170,926 | 10/1979 | Emmett | 92/248 X |
| 4,203,354 | 5/1980 | Cunningham | 92/248 X |

FOREIGN PATENT DOCUMENTS

| | | | |
|---|---|---|---|
| 1182087 | 11/1964 | Fed. Rep. of Germany | 188/72.5 |
| 2,134,940 | 7/1971 | Fed. Rep. of Germany | 188/370 |
| 1264794 | 5/1961 | France | 188/72.5 |

*Primary Examiner*—Robert G. Nilson
*Attorney, Agent, or Firm*—James F. Tao; James F. Mudd

[57] ABSTRACT

An improved disc brake plastic piston is described which has a metallic cap or face which provides a means of attaching a brake shoe or a brake shoe assembly, or provides a dust boot groove, or, in a most preferred mode, the metallic cap component provides both a brake shoe retaining means and a dust boot groove.

The piston is comprised of a cylindrical plastic body having an open end and a closed end. At least one ring bead can extend from the wall of the piston body contiguous to, or near, the open end. The bead or beads are suitably ejector beads utilized in the molding operation. A metallic cap extends over the end wall of the open end of the cylindrical body and is secured to the body by being snap fit or clamped over the ring bead. The cap is adapted to receive and hold a brake shoe clip, or provide a dust boot groove, and, in a most preferred embodiment, provides both a brake shoe retaining means and a dust boot groove.

Alternative means for anchoring the metallic cap are provided, such as by crimping the interior lip of the metallic cap.

7 Claims, 9 Drawing Figures

PISTON FOR DISC BRAKES

REFERENCE TO PRIOR APPLICATION

This is a continuation-in-part of copending application Ser. No. 202,510, filed Oct. 31, 1980.

BACKGROUND OF THE INVENTION

The present invention relates to an improved piston for disc brakes, such as vehicular disc brakes. More in particular, the present invention relates to an improved plastic brake piston having a metallic cap positioned on the face of the piston which is adapted to engage the brake shoe or brake shoe attaching means, such as a clip. The cap provides a protective cover for the plastic piston face nearest the braking means and also provides a means for retaining the brake shoe or brake shoe clip, and may also provide a means for retaining a dust boot. Also, the metallic cap can provide a means for shielding the dust boot from the adverse affects of heat.

Although the present invention will be described in terms of disc brakes, particularly intended for motor vehicles, it will be understood that the present improved piston is equally adaptable to piston brakes utilized on railroad vehicles and industrial applications such as engines.

One type of brake assembly presently in use in motor vehicle disc brakes is the opposed piston type. In such type, a piston is positioned adjacent each opposite side of a brake disc and forces its respective brake shoe or lining against the disc to impart a braking action. Other types of brake assemblies to which the present invention is equally useful are those in which a single piston is utilized to move the brake shoe or lining into contact with both sides of the brake disc by utilizing a caliper slide to impart a braking action.

Upon the advent of the use disc brakes in motor vehicles, the pistons used were metallic, usually fabricated of chrome plated steel, and required several time consuming and costly machining operations. More recently, pistons for disc brakes have been fabricated of a plastic material, usually a phenolic resin molding compound. Such pistons may be produced by molding techniques known in the art. Typical plastic pistons are described in U.S. Pat. No. 4,170,926, the teachings of which are hereby incorporated herein by reference. Plastic pistons can be molded with at least one ring bead on the force portion of the mold to create an undercut to assist in withdrawing the piston from the mold when the mold is opened. Up to the present time, such ejector beads have been positioned on the piston to be inconspicuous and non-interfering with the piston operation. It has now been found that the ejector bead may be utilized to provide an improved brake piston.

More recent designs of plastic pistons embody a hollowed cylinder having an internal groove for retaining a brake shoe clip. The groove, by necessity, has to be formed after the molding operation and requires a machining step. Such pistons may also require a groove, typically on the outside wall, to retain a dust boot or cover. The forming of a dust boot groove in the piston also requires machining after molding, which, in turn, adds a further machining step. It has now been found that the ejector bead or beads previously thought a useless necessity can be utilized to eliminate one or more machining steps. In situations where the ejector bead is not used or desired, alternative anchoring means can be provided.

DISCLOSURE OF THE INVENTION

The improved disc brake plastic piston of the present invention has a metallic cap or face which provides a means of attaching a brake shoe or a brake shoe assembly, or provides a dust boot groove, or, in a most preferred mode, the metallic cap component provides both a brake shoe retaining means and a dust boot groove. Any of the metallic caps of the invention can be provided with means for shielding the dust boot from heat.

The present piston is comprised of a cylindrical plastic body having an open end and a closed end. The "closed end" can be cored out for structural and other purposes and is deemed to be within the foregoing description. In one embodiment at least one ring bead extends from the wall of the piston body contiguous to, or near, the open end. The bead or beads are suitably ejector beads utilized at the end of the molding operation to remove the part from the mold. A metallic cap extends over the end wall of the open end of the cylindrical body and is secured to the body by being snap fit or clamped over the ring bead. The cap is adapted to receive and hold a brake shoe clip, or provide a dust boot groove, and, in a most preferred embodiment, provides both a brake shoe retaining means and a dust boot groove.

While the invention has been described with respect to use of the ring beads on the external and internal walls of the piston, other embodiments omit the use of such ring beads. Alternative means for anchoring or attaching the metallic cap to the piston where no ring beads are provided at the point of attachment, include modifying the normally regular edge surface of the interior. Such modifications include crimping, notching or lancing the metallic edge in one or more places, or serrating all or portions of the metallic edge.

All of the foregoing embodiments of the invention can be further modified to provide a metallic extension which serves as a heat shield for the dust boot. In normal practice, dust boots are subject to heat generated during operation of the disc brakes. Ordinarily, there is no means for protecting the dust boot and deterioration occurs. The metallic cap provides a way to provide a heat shield. The metallic cap is extended outwardly over the dust boot to shield the boot from the adverse affects of heat. The heat shield can take various physical forms as will be illustrated hereinafter.

The metallic cap can be coated with a plastic or other surface to provide a barrier to heat and sound. Such a coating is particularly advantageous on the surface which contacts or faces the disc backing plate. A suitable coating for this purpose is a Buna-N rubber coating.

The present composite piston eliminates machining to form a groove in the piston to provide a means of retaining the brake shoe or the dust boot. Accordingly, the present piston can be fabricated with a thinner wall section than the plastic pistons of the prior art. In addition, the present composite piston provides a sound barrier layer enabling a quieter operation of the vehicle brakes. The metal face also reduces scuffing of the surface against the brake shoe backing plate, and distortion of the piston due to high compressive load at elevated temperature. The metal face provides an improved means of dissipating heat. The metallic cap further protects the edges of the piston against chipping and other damage, and provides a prying surface to be utilized during brake repair.

BEST MODES FOR CARRYING OUT THE INVENTION

Figure 1:
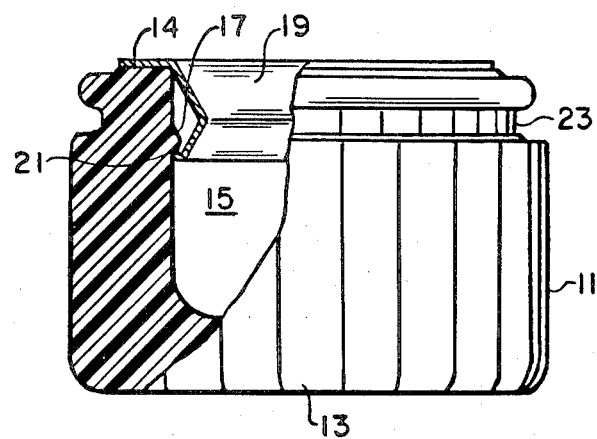
FIGS. 1 through 9 are elevational views of the present composite piston, partly in section, to illustrate various preferred embodiments of the invention.

Looking now at FIG. 1, cylindrical piston 11 has a closed end 13 and an open end 15. Ring bead 17 extends from the internal wall of piston 11. Metallic cap 19, preferably of steel, extends over and covers end wall 14 or open end 15 of piston 11 and is secured on piston 11 by being snap fit or clamped over bead 17 along shaped portion 21. Cap 19 is adapted to receive a typical brake shoe clip, not shown, by receiving the brake shoe clip therein and securing the brake shoe clip by being snap fit. In this embodiment, a groove 23 would be required to be machined to provide a means of retaining a dust boot.

Figure 2:
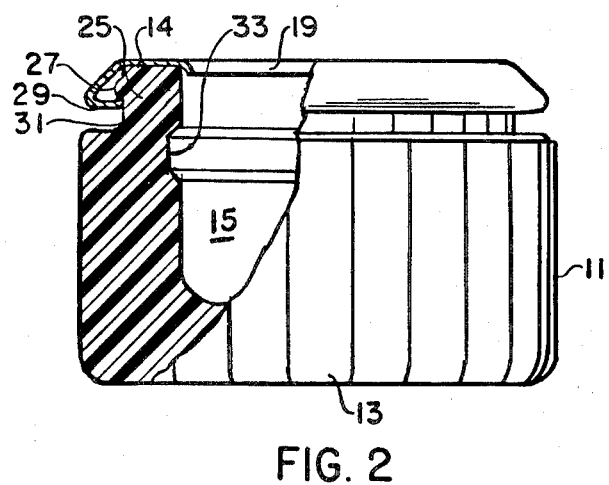

FIG. 2 illustrates an embodiment of the invention wherein piston 11 has a narrow portion 25 contiguous to open end 15. A ring head 27 is positioned in or along narrowed portion 25. Metallic cap 19 in this embodiment extends over and covers end wall 14 of piston 11 and is snap fit or clamped over bead 27 along shaped portion 29 and provides groove 31 adapted to receive and hold a typical dust boot, not shown. In this embodiment, groove 33 may be required to be machined to provide a means of retaining a brake shoe clip.

Figure 3:
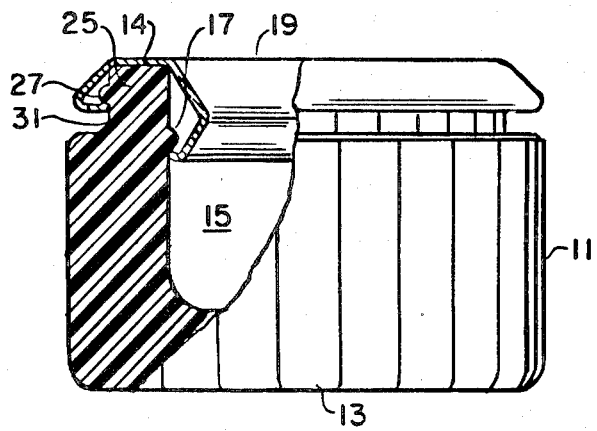

Looking now at FIG. 3, the most preferred embodiment, piston 11 has a narrowed portion 25 and internal ring bead 17 and external ring bead 27. Metallic cap 19 extends over and covers end wall 14 of open end 15 and is snap fit or clamped over both bead 17 and bead 27. As shown in FIG. 3, two ring beads, 17 and 27, are utilized; however, it will be understood that single bead, either internal or external, may be used to secure the cap member 19 to the piston member 11. Cap 19 provides a means of retaining a typical brake shoe clip entering open end 15 and also provides a groove 31 for retaining a typical dust boot.

Figure 4:
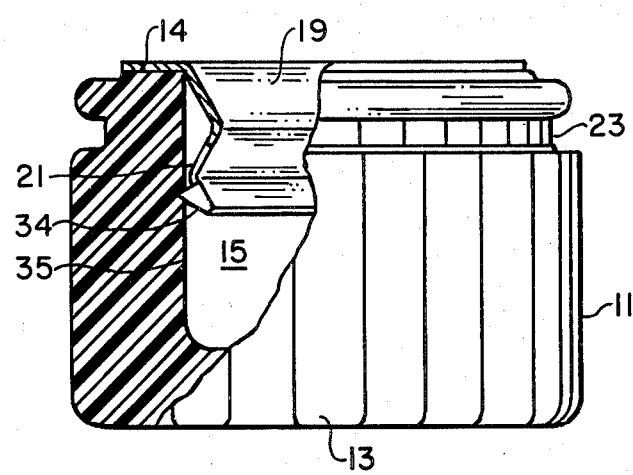

In the embodiment shown in FIG. 4, cylindrical piston 11 has a closed end 13 and an open end 15. Metallic cap 19, preferably of steel, extends over and covers end wall 14 or open end 15 of piston 11 and is secured on piston 11 by one or more crimps 34 along shaped portion 21. The crimps embed into the inside wall 35 of the piston to hold metallic cap 19 in place on piston 11. Cap 19 is adapted to receive a typical brake shoe clip, not shown, by receiving the brake shoe clip therein and securing the brake shoe clip by being snap fit. In this embodiment, a groove 23 would be required to be machined to provide a means of retaining a dust boot.

Figure 5:
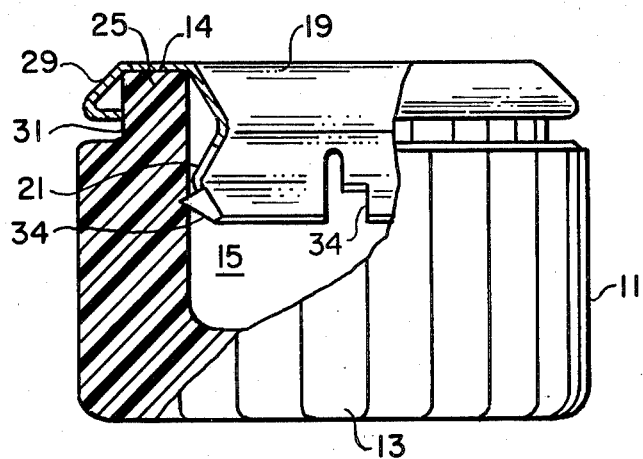

FIG. 5 illustrates an embodiment wherein piston 11 has a narrowed portion 25. Metallic cap 19 extends over and covers and wall 14 of open end 15 and is secured on piston 11 by one or more crimps 34 along shaped portion 21. The crimps embed into the inside wall 35 of the piston to hold metallic cap 19 in place on piston 11. As shown in FIG. 5, no ring beads are utilized; however, it will be understood that an external bead can be used to further secure the cap member 19 to the piston member 11. Cap 19 provides a means of retaining a typical brake shoe clip entering open end 15 and also by means of shaped portion 29 provides a groove 31 for retaining a typical dust boot.

Figure 6:
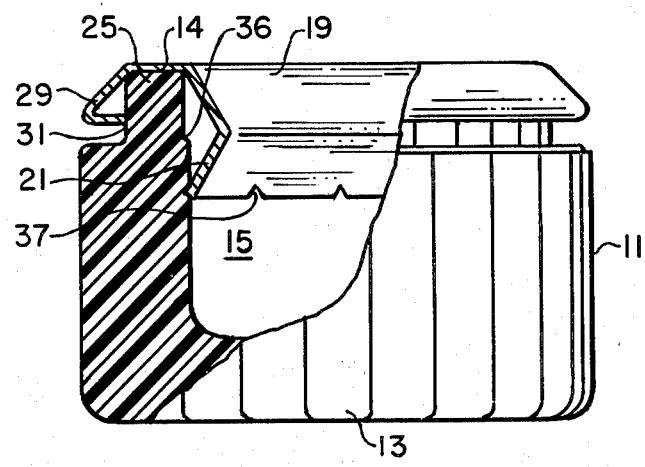

In the embodiment shown in FIG. 6, piston 11 has a narrowed portion 25 and the inside wall is provided with ramp 36 such that the diameter of the inside wall 34 is narrower near closed end 13 than at the end wall 14. Metallic cap 19 extends over and covers end wall 14 of open end 15 ad is secured on piston 11 by one or more notches 37 along shaped portion 21. The notches embed into the inside wall 35 of the piston to hold metallic cap 19 in place on piston 11. As shown in FIG. 6, no ring beads are utilized; however, it will be understood that an external bead can be used to secure the cap member 19 to the piston member 11. Cap 19 provides a means of retaining a typical brake shoe clip entering open end 15 and also by means of shaped portion 29 provides a groove 31 for retaining a typical dust boot.

Figure 7:
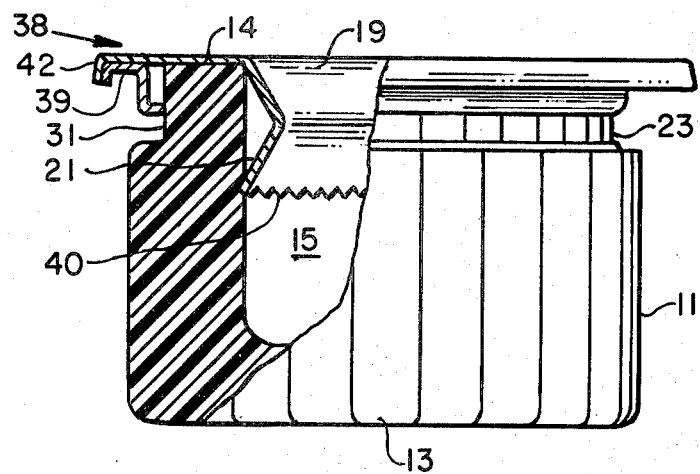

In the embodiment shown in FIG. 7, cylindrical piston 11 has a closed end 13, an open end 15, and a narrowed portion 25, contiguous with open end 15. Metallic cap 19, preferably of steel, extends over and covers end wall 14 of open end 15 of piston 11 and is secured on piston 11 by serrations 40 along shaped portion 21. The serrations embed into the inside wall 35 to hold cap 19 in place on piston 11. Cap 19 is adapted to receive a typical brake shoe clip, not shown, by receiving the brake shoe clip therein and securing the brake shoe clip by being snap fit. In this embodiment, a heat shield 38 is provided by extending the metallic cap 19 outwardly from end wall 14 such that the heat shield partially covers a typical dust boot (not shown). Additionally, element 39 is formed and pressed into edge 42 of cap 19 to provide groove 31 which is adapted to receive and hold the typical dust boot. Alternatively, element 39 can be welded to cap 19.

Figure 8:
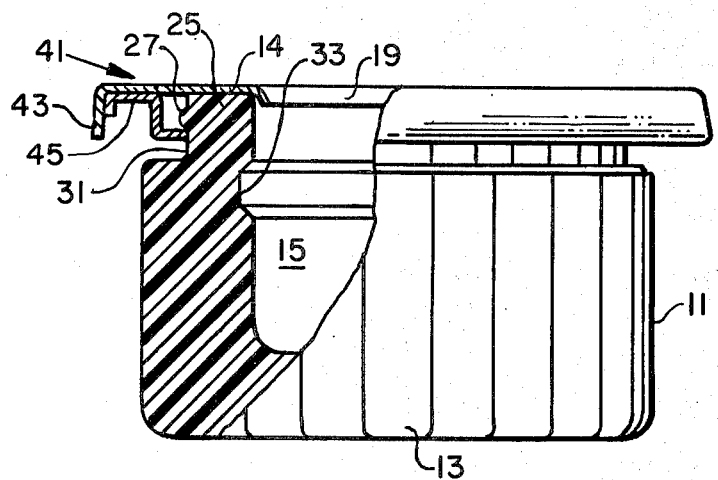

FIG. 8 illustrates an embodiment of the invention wherein piston 11 has a narrow portion 25 contiguous to open end 15. A ring bead 27 is positioned in or along narrowed portion 25. Metallic cap 19 in this embodiment extends over and covers end wall 14 of piston 11 and extends outwardly from end wall 14 to form heat shield 41 which partially covers a typical dust boot (not shown). Heat shield element 43 provides further heat protection to the dust boot. In addition to this, element 45 is formed and pressed into cap 19 and is snap fit or clamped over bead 27 to provide groove 31 adapted to receive and hold the typical dust boot. In this embodiment, groove 33 may be required to be machined to provide a means of retaining a brake shoe clip.

Figure 9:
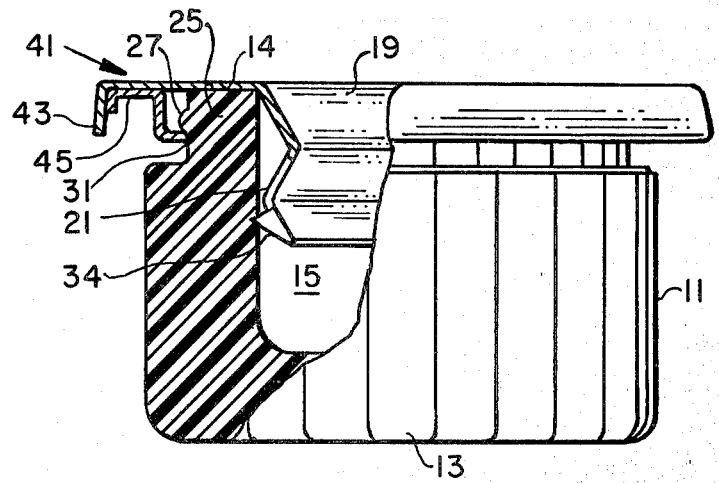

In FIG. 9, piston 11 has a narrowed portion 25 and external ring bead 27. Metallic cap 19 extends over and covers end wall 14 of open end 15 and is secured to piston 11 by being snap fit or clamped over bead 17 and by means of one or more crimps 34 along shaped portion 21. The crimps embed into the inside wall 35 of the piston to hold metallic cap 19 in place on piston 11. As shown in FIG. 9, one ring bead 17 is utilized; however, it will be understood that only the crimp members 34 may be used to secure the cap member 19 to the piston member 11. Cap 19 provides a means of retaining a typical brake shoe clip entering open end 15 and also provides a groove 31 for retaining a typical dust boot. Cap 19 extends outwardly from end wall 14 to form heat shield 41 which is adapted to partially cover a typical dust boot (not shown). Heat shield element 43 provides additional heat protection to the dust boot. Element 45 is formed to press fit into cap 19 and is snap fit or clamped over bead 27 to provide groove 31 adapted to receive and hold the dust boot.

The foregoing description and embodiments are intended to illustrate the invention without limiting it thereby. It will be understood that various modifications can be made in the invention without departing from the spirit or scope thereof.

What is claimed is:

1. A composite vehicular brake piston for activating vehicular brake shoe during braking of a vehicle comprised of a cylindrical resin body having an open end and a closed end and a metallic cap extending over the end wall of said open end and secured to said body by an anchoring means, wherein said body has a narrowed portion in the outer wall thereof contiguous to said open end, a bead being positioned on the outer wall in said narrowed portion to secure said metallic cap to said resin body by a snap fit over said bead, the end of said cap and the portions of said body adjacent said narrowed portion providing a groove adapted to receive a dust boot.

2. The piston of claim 1 wherein an anchoring means is positioned within the open end of said body and said metallic cap is adapted to receive and hold a brake shoe clip.

3. The piston of claim 2 wherein said anchoring means is a crimp, notch or serration in the inner edge of said metallic cap which engages the piston body.

4. The piston of claim 2 wherein said anchoring means is a bead extending from the body wall within the open end of said body.

5. A composite vehicular brake piston for activating a vehicular brake shoe during braking of a vehicle comprised of a cylindrical resin body having an open end and a closed end, at least one bead extending from the end wall of said body contiguous to said open end, a metallic cap extending over the end wall of said open end and secured to said body by a snap fit over said bead, wherein the said body has a narrowed portion in the outer wall thereof contiguous to said open end, said bead being positioned in said narrowed portion of the outer wall to secure said metallic cap to said resin body by a snap fit over said bead, the end of said cap and the portion of said body adjacent said narrowed portion providing a groove adapted to receive a dust boot.

6. The piston of claims 1 or 5 wherein the metallic cap has means for shielding a dust boot from heat generated by the operation of a disc brake.

7. The piston of claims 1 or 5 wherein the metallic cap has means for shielding a dust boot from heat generated by the operation of a disc brake, wherein said end of said cap also serves as the support of the heat shielding means.

* * * * *